United States Patent [19]

Iwashita et al.

[11] 4,392,730
[45] Jul. 12, 1983

[54] MOTOR DRIVEN REWIND DEVICE FOR CAMERA

[75] Inventors: Tomonori Iwashita, Fuchu; Hidehiko Fukahori, Yokohama, both of Japan

[73] Assignee: Canon Kabushiki Kaisha, Japan

[21] Appl. No.: 321,526

[22] Filed: Nov. 16, 1981

[30] Foreign Application Priority Data

Nov. 22, 1980 [JP] Japan ............................ 55-168020[U]
Nov. 25, 1980 [JP] Japan ................................ 55-165541

[51] Int. Cl.³ .............................................. G03B 1/12
[52] U.S. Cl. ..................................... 354/173; 354/214
[58] Field of Search ............... 354/173, 214; 242/71.6; 352/124

[56] References Cited

U.S. PATENT DOCUMENTS 3,735,683 5/1973 Umeda ................................ 242/71.6
3,994,003 11/1976 Iwashita et al. ................. 354/214 X
4,306,794 12/1981 Fukahori et al. ................ 354/214 X

*Primary Examiner*—William B. Perkey
*Attorney, Agent, or Firm*—Toren, McGeady and Stanger

[57] ABSTRACT

A motor driven rewind device for a camera operating in such a manner that an actuation of a rewind control member initiates an energization of an electric motor, and driving torque of this motor brings a rewind shaft into operative connection with a spool shaft of the film patrone so that a film rewinding operation is initiated, wherein the rewind control member is made lockable in each operative position, and a compressed spring is provided between a rewind coupler engaging the aforesaid spool shaft and the aforesaid rewind shaft receptive of the driving torque of the motor to exert an absorbing action in the rotative and axial directions of said coupler, whereby the film rewind control is made more reliable.

8 Claims, 8 Drawing Figures

MOTOR DRIVEN REWIND DEVICE FOR CAMERA

BACKGROUND OF THE INVENTION

1. Field of the Invention

This invention relates to motor driven rewind devices for cameras, and more particularly to a motor driven rewind device for cameras wherein energization of an electric motor is initiated by a rewind actuation, and wherein this energized motor brings a rewind shaft into engagement with a spool shaft of the film patrone to effect a rewinding operation of the film.

2. Description of the Prior Art

In the past there has been proposed a wide variety of motor driven film rewind devices for camera. Particularly in recent years, there has been in wide use a mechanism wherein driving of the rewind shaft by the driving torque of the motor is initiated after the rewind shaft has been engaged with the pawls of the film patrone shaft through the rewind coupler. According to this method, driving does not occur until the rewind shaft of the motor driven rewind device engages the patrone pawls, and only when engaged is the rewind driving initiated. Therefore, the initiation of a rewinding operation takes a long ramping time. This constitutes a drawback in that the rewinding time cannot be shortened.

A method to overcome the above-described drawback has been proposed by the applicants of the present patent application in U.S. Pat. No. 4,306,794 of Dec. 22, 1981. In this device, the rewind shaft while being rotated in a direction in which the film is rewound is lifted upwards to engage with the patrone hub, whereby it is made possible to shorten the ramping time at the time when the rewinding is initiated. However, since this method involves lifting of the rewind shaft while simultaneously rotating it, when the rewind coupler connected to the rewind shaft is to engage with the film patrone hub, as the patrone hub is given a driving force in two directions, or both along and about the rotation axis at the same time, the device provided with an absorption mechanism which works only in the vertical direction of the rewind coupler, as described in the above-cited patent, produces a drawback in that an increase of the driving torque of the electric motor for the purpose of establishing the engagement of the two members without failure results in the blockage of the vertically operated absorbing mechanism due to the friction force exerted by the driving force in the rotative direction. Therefore, the engagement of the rewind coupler and the patrone hub is not established with high reliability. That is, such a rewind device cannot transmit the driving torque of the electric motor to the shaft of the film patrone with good efficiency, and the reliability of film rewind control cannot be improved.

In this connection, it should be explained that such a motor driven rewind device has to fulfill the following requirements to make the film rewind feasible. That is:

(a) So long as a film exposure is being performed, unintentional actuation should not initiate a film rewinding operation.

(b) As the filming ends, a simple manipulation should suffice to quickly initiate a rewinding operation.

(c) The rewinding operation should continue without the necessity for the operator's finger to remain on the rewind control member. (If necessary, an operator using two cameras at a time can, while rewinding one camera, perform a filming operation with the other camera).

(d) As the rewinding operation is terminated, a simple manipulation should suffice to return the camera to the winding mode.

However, the above-described conventional motor driven rewind device, in view of (a), lacks a lock mechanism, and, even with the provision of a lock mechanism, it is only after the sprocket release button is depressed by the right hand that the rewind control member can be operated, thus inhibiting the quick switching to the rewind mode in view of (b). Also, with regard to (c), the operator must continue depressing the rewind control member with his finger during the time when the film is being rewound. Even for (d), there is a need to manually return the control member to the initial position. Thus, the need for manageability gives rise to many problems which must be solved. In this respect, the conventional motor driven rewind device cannot accomplish the object of switching the camera to the film rewind mode with high accuracy and reliability, and there has been a strong demand for improvements.

SUMMARY OF THE INVENTION

The present invention is intended to eliminate such drawbacks of the conventional device, and its object is to provide a motor driven rewind device for a camera capable of initiating a film rewinding operation with high accuracy and reliability.

Another object of the invention is to provide a motor driven rewind device for a camera with a rewind coupler arranged to engage with the shaft of the film patrone to initiate a rewinding operation, wherein driving torque of an electric motor is transmitted to said coupler through an absorbing means having an absorbing action in directions along and about the rotation axis of the coupler, whereby a positive engagement of the rewind coupler with the patrone shaft is reliably established.

Still another object of the invention is to provide a motor driven rewind device for a camera with means rendering it possible with very simple management to lock the rewind control member in each operative position and to return the rewind control member to the initial position as the locking is released, it thereby being made possible to initiate and terminate a rewinding operation quickly and with ease.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENT

Figure 1:
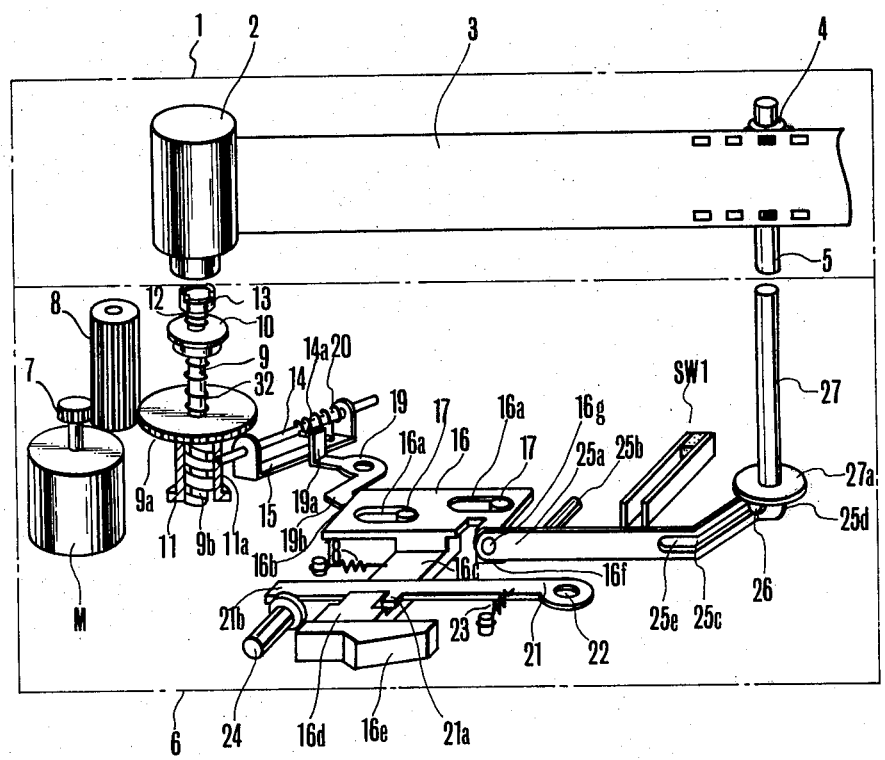
FIG. 1 is a perspective view of an embodiment of a motor driven rewind device according to the present invention.
Figure 3:
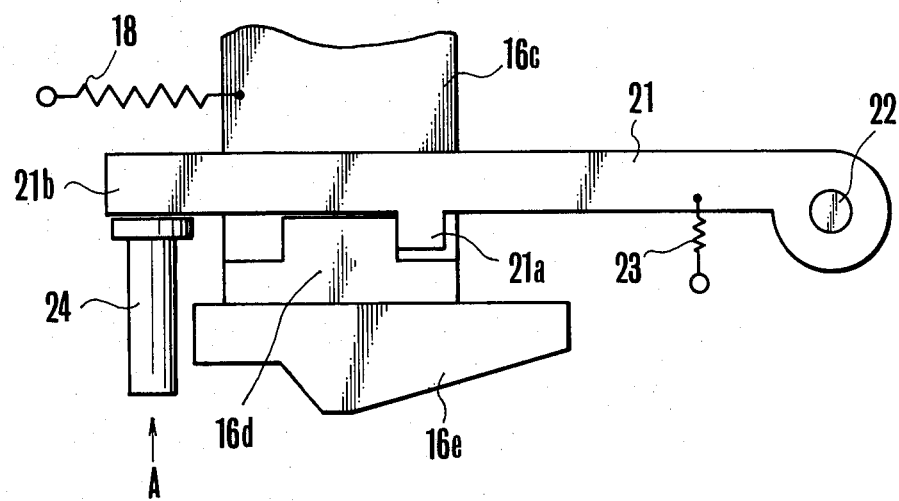
FIG. 3 is a plan view of the rewind control member of FIG. 1 in an initial position.
Figure 4:
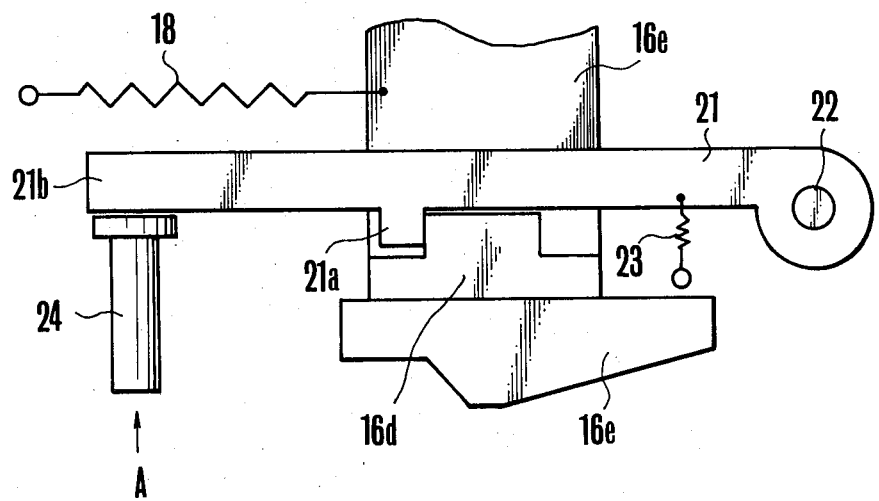
FIG. 4 is a similar view of the rewind control member in an advanced position for rewind mode.

The present invention is next described by reference to the drawings. In FIG. 1, 1 is a camera body; 2 is a film patrone loaded within the camera housing; and 3 is a film. 4 is a sprocket for film advancement; 5 is a sprocket release button which, upon being pushed upwardly, will render the sprocket 4 freely rotatable by a mechanism (not shown), known in the art, so that the film 3 can be rewound. 6 is a motor driven film rewind device; M is an electric motor having an output shaft on which a pinion 7 is fixedly mounted. 8 is an intermediate gear rotatably mounted on a shaft (not shown) and meshing with the pinion 7. 9 is a rewind shaft journalling in upper and lower bushes 10 and 11 which are fixedly mounted to a casing (not shown) of the rewind device, and restrained in its position by a spring 32 acting downwardly. Mounted on the upper end of the rewind shaft 9 is a rewind coupler 13 for engagement with the hub of a spool within the patrone 2 through an absorption spring 12, to be described in more detail hereinafter, and at the center thereof is a gear 9a meshing with the intermediate gear 8. Also in the lower part of the rewind shaft 9, there is provided a spiral groove 9b. 14 is a guide pin slidingly movably mounted on a support 15 which is fixedly mounted to the casing of the rewind device. The pin 14 is arranged upon engagement with the spiral groove 9b of the rewind shaft 9 through a hole 11a of the lower bush 11 to cause upward movement of the rewind shaft 9 as the rewind shaft 9 rotates. After lifting of the shaft 9 by a predetermined amount, the pin 14 moves under the bottom face of the rewind shaft 9, thereby holding the rewind shaft 9. 16 is a slider having elongated slots 16a through which respective pins 17 extend. The pins 17 are fixedly mounted on the device casing (not shown) so that the slider 16 is slidable in the lateral direction as viewed in the drawing, and is restrained in its position by a spring 18 acting to the left. 19 is an intermediate lever pivotally mounted on a pin (not shown) and having an upward extension 19a at one end thereof which engages a pin 14a mounted on the guide pin 14, the other end of which engages the end portion 16b of the slider 16. The guide pin 14 is urged by a spring 20 in a direction to engage the rewind shaft 9, but since the spring 20 is made weaker than the spring 18, the slider 16 is normally positioned at an illustrated location under the action of the spring 18. At this time, the guide pin 14 is restrained in its position through the intermediate lever 19 in a direction (or the position illustrated in FIG. 1) for disengagement from the spiral groove 9b of the rewind shaft 9. Also an armed portion 16c of the slider 16 is provided with a locking lobe 16d, the details of which are shown in FIGS. 3 and 4, and it fixedly carries at its end a control knob 16e. 21 is a lock lever pivotally mounted at a pin 22 which is fixedly mounted to the device casing (not shown), and urged by a spring 23 in a counterclockwise direction. At the center of the length of the lock lever 21 is a projected portion 21a which, when engaging the lobe 16d of the slider, restrains the slider 16 from lateral movement. 24 is a push button positioned adjacent the rear end side of the control knob 16e as viewed from a direction in which an actuation is effected, slidingly movably supported in the casing of the device, and engaging the lock lever 21 at its free end 21b. 25 is a communication lever of which one end 25a is pivotally mounted on a pin 16g fixedly mounted on a bent portion 16f of the slider and having a pin 25b mounted at an intermediate point of the length thereof to control the ON and OFF operation of a switch SW1. The opposite end of the communication lever 25 has a cam slot 25c which is pivotally fitted on a pin 26 fixedly mounted to the casing of the device so that lateral movement of the slider 16 is converted to vertical movement. Also the upper end 25d of the communication lever 25 engages a flanged portion 27a of a vertically movable pin 27, said pin 27 engaging the aforesaid sprocket release button 5.

Figure 2:
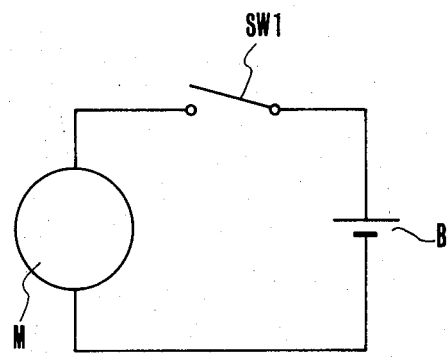
FIG. 2 is an electrical circuit diagram of a motor drive circuit in the embodiment illustrated in FIG. 1.

Again, the motor M is connected to an electrical power source or battery B through the switch SW1 as illustrated in FIG. 2, so that when the pin 25b acts on the switch SW1, driving is initiated.

Figure 5:
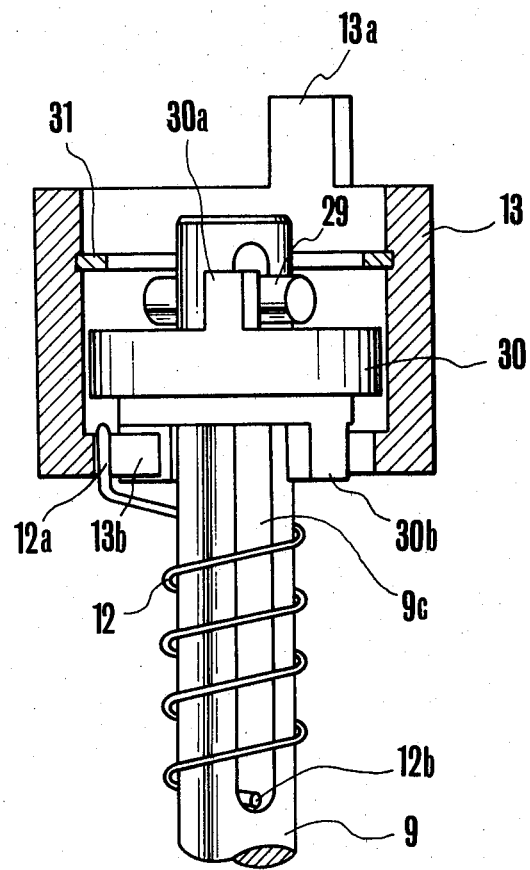
FIG. 5 is an elevational view of the rewind coupler of FIG. 1 in an initial position.
Figure 6:
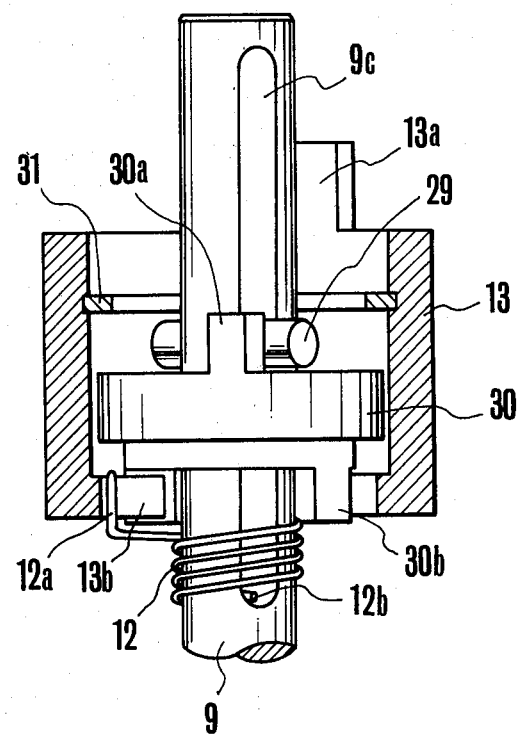
FIG. 6 is a similar view of the rewind coupler in an engaging position.

FIGS. 5 and 6 illustrate the details of the rewind coupler 13 of the device of FIG. 1. In these figures, 9 is the rewind shaft illustrated in FIG. 1, having an elongated slot 9c. A pin 29 is inserted into and seated in the elongated slot 9c. An interconnection member 30 is rotatably mounted on the rewind shaft 9 and has projected portions 30a on the upper end thereof to engage the pin 29, and its lower end also has projected portions 30b to engage the armed portion 13b of the rewind coupler at the lower end. 31 is an escapement stop fixedly mounted to the rewind coupler 13 to prevent the aforesaid pin 29 and interconnection member 30 from axially slipping out of the interior of the rewind coupler 13 as the pin 29 and the interconnection member 30 are set in. The absorption spring 12 is connected at one end thereof to the armed portion 13b of the rewind coupler 13, the opposite end of which is inserted into and seated in the elongated slot 9c of the rewind shaft 9 so that the spring 12 functions as both a compressed spring and a torsion spring. Therefore, the compressed spring function of the absorption spring 12 allows for the rewind coupler 13 containing the pin 29 and interconnection member 30 to be normally positioned at the uppermost point of the rewind shaft 9 as illustrated in FIG. 5. When a force is applied downwardly to the upper face of the rewind coupler, as the pin 29 moves downwards along the elongated slot 9c, the rewind coupler 13 along with the pin 29 and interconnection member 30 is moved downwards against the force of the absorption spring 12 as illustrated in FIG. 6, thus constituting an absorption mechanism for the rewind coupler 13 which works along the spool hub (or in the vertical direction).

Figure 7:
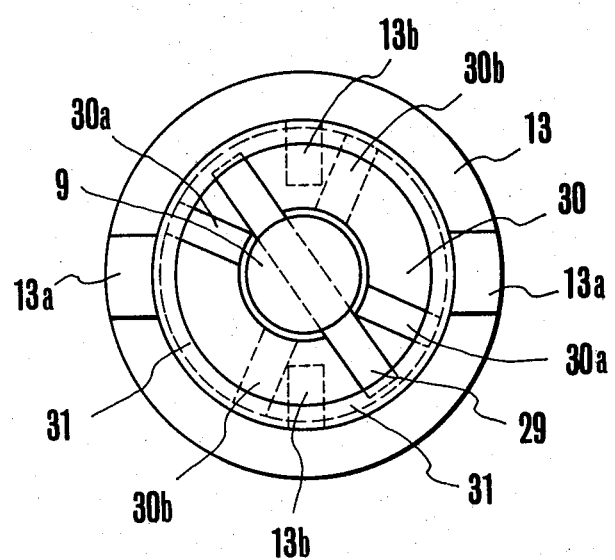
FIG. 7 is a plan view looking from above of the rewind coupler of FIG. 5.
Figure 8:
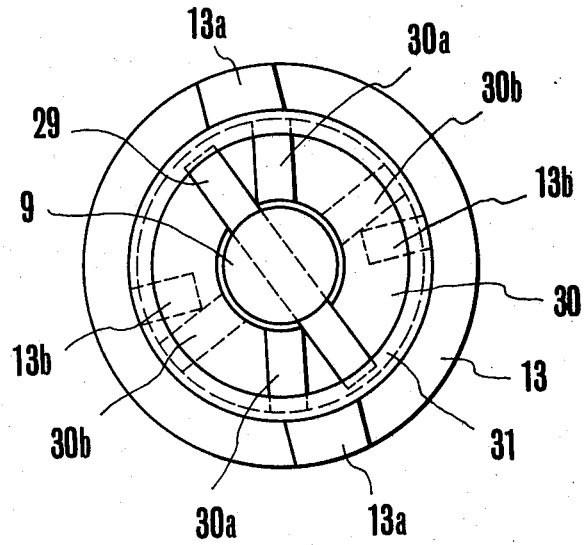
FIG. 8 is a plan view looking from above of the rewind coupler of FIG. 6.

FIGS. 7 and 8 are plan views looking from above of the rewind coupler 13. The torsion spring function of the normally coiled absorption spring 12 allows for the rewind coupler 13 to be restrained in its position to a clockwise direction about the rewind shaft 9. That is, as illustrated in FIG. 7, the rewind coupler 13 takes a position where the pin 29 engages the projected portions 30a of the interconnection member 30, and the armed portion 13b of the rewind coupler 13 engages the projected portions 30b of the interconnection member 30. As a film rewinding operation is initiated, when a counterclockwise torque is given to the rewind coupler 13, the rewind coupler 13 only is first turned in the counterclockwise direction to a position where the armed portion 13b engages with the projected portions 30b of the interconnection member 30 (at the opposite faces to those when in the position of FIG. 7). Then, the rewind coupler 13 and interconnection member 30 in unison turn in the counterclockwise direction to a position where the projected portions 30a of the interconnection member 30 engage with the pin 29 (at the opposite faces to those when in the position of FIG. 7), thus taking the position as illustrated in FIG. 8. It will be understood that the allowance of counterclockwise displacement of the rewind coupler 13 about the rewind axis 9 against the absorption spring 12 constitutes an absorption mechanism for rotative movement of the rewind coupler 13.

The operation of the device of such construction is as follows: When in the winding mode, the motor driven rewind device of the invention assumes a position illustrated in FIG. 1 where the slider 16 and rewind coupler 13 take their places as illustrated in FIGS. 3 and 5 respectively. After the exposure has been completed, to rewind the film 3, the operator first pushes the button 24 in the direction indicated by arrow A (see FIG. 3), whereby the free end 21b of the lock lever is also moved backwards, as the lock lever 21 turns in the counterclockwise direction against the force of the spring 23. Then, when the projected portion 21a moves away from the one side of the lobe 16d of the slider 16, the slider 16 is rendered slidingly movable to the right. Next, when the control knob 16e is moved to the right by the finger, the slider 16 moves to the right against the spring 18 guided by the pin 17. Such movement first causes the upper end 25d of the communication lever to move upwards by the action of the cam slot 25c which in turn causes the pin 27 also to move upwards, whereby the sprocket release button 5 is lifted to render the sprocket 4 freely rotatable. Further rightward sliding movement of the slider 16 causes the communication lever 25 to stop from further upward movement since the parallel portion 25e of the cam slot 25c comes to engage the pin 26, and then the switch SW1 is turned on by the pin 25b. Such rightward movement of the slider 16 also causes the intermediate lever 19 engaging the end portion 16b to turn in the counterclockwise direction which in turn causes the guide pin 14 to move toward the rewind shaft under the action of the spring 20, finally engaging in the spiral groove 9b of the rewind shaft 9. When the control knob 16e reaches the rightmost position, the projected portion 21a of the lock lever 21 engages with the opposite side of the lobe 16d of the slider 16 (see FIG. 4). Thus, the slider 16 is locked in the rightwardly advanced position against the force of the spring 18. Therefore, the finger of the operator may be removed from the control knob, while permitting the slider to be left unchanged from the position illustrated in FIG. 4.

The closure of the switch SW1 connects the winding of the motor M to the battery B, and the motor M rotates. Motion of the motor M is transmitted through the gears 7, 8, and 9a to the rewind shaft 9. Since the guide pin 14 engages in the spiral groove 9b of the rewind shaft 9, the rewind shaft 9 is then lifted up against the spring 32, while being rotated, whereby the rewind coupler 13 is brought into engagement with the spool hub (not shown) of the patrone 2. As the rewind shaft is further lifted up while being rotated, when the bottom end of the rewind shaft 9 is aligned to the guide pin 14, the lifting operation is terminated. But, rotation of the spool of the patrone 2 only proceeds, thus rewinding the film 3 by the motor M. It is to be noted that during the time from the engagement of the pawled portion 13a of the rewind coupler 13 with the spool hub (not shown) to the termination of the lifting operation, the vertically effective aspect of the absorption mechanism for the rewind coupler 13 prevents an excessive lifting of the rewind coupler 13 by the rewind shaft 9 from occurring, and the tangentially effective aspect of the absorption mechanism prevents rotative movement of the rewind shaft 9 from causing the pawled portions 13a of the rewind coupler 13 to cling to the spool hub (not shown).

After that, to terminate the film winding operation, the operator will push the button 24 in the direction indicated by arrow A (see FIG. 4), whereby the lock lever 21 is turned again in the counterclockwise direction against the spring 23 to disengage the projected portion 21a from the lobe 16d of the slider 16. Then, the slider 16 is moved to the left by the action of the spring 18, and, upon reaching the initial position, brings the projected portion 21a into re-engagement with the one side of the lobe 16d of the slider 16 (see FIG. 3). Such movement also causes the intermediate lever 19 to turn in the clockwise direction as it is pushed by the end portion 16b of the slider, which in turn causes the guide pin 14 to move against the spring 20, whereby the guide pin 14 is disengaged from the rewind shaft 9. Then, the rewind shaft 9 is moved downwards by the spring 12, returning to the initial position of FIG. 1. Also, the communication lever moves to the left so that the pin 27 drops, and the pin 25b opens the switch SW1 to stop energization of the motor M.

As has been described in greater detail, the present invention provides an arrangement such that the rewind control member is latched in each operative position, and wherein pushing of the lock release member returns the rewind control member to the initial position. By this arrangement, it is made possible (a) to avoid an accidental switching of the camera from the wind to the rewind mode, (b) to quickly initiate a rewinding operation as the filming ends, (c) for the operator not to have to touch his finger on the rewind control member throughout the rewinding operation, and (d) to stop the rewinding only by pushing the lock release member as the rewinding comes to an end. Also, according to the present invention, since the rewind coupler has an absorbing action in the tangential and axial directions, it follows that despite the fact that the rewind shaft while being rotated is axially moved to thereby bring the rewind coupler into engagement with the spool hub of the patrone, the cling which would otherwise be caused to occur by its frictional force can be prevented, and the positive engagement of the rewind coupler with the spool hub can be established. This feature of the present invention provides a motor driven rewind device capable of initiating a rewinding operation quickly and reliably. That is, according to the present invention, the procedure from the actuation of a rewind control to the initiation of a rewinding of the film can be made extremely accurate and reliable. Further, according to the present invention, the switching from the rewind to the wind mode also can be effected by a very simple operation, and therefore the stopping of the rewind device can be controlled with high accuracy and reliability.

It should be pointed out that though the above embodiment of the invention has been described in connection with the use of one interconnection member in the absorption mechanism, if the angle of absorption may be smaller, the interconnection member can be omitted with a slight modification wherein the pin is engaged directly with the arms of the rewind coupler. If the angle of absorption must be increased, two or more interconnection members may be used to effect an equivalent result.

Also, though the above embodiment has been described with the camera body and the motor driven rewind device separate from each other, it is of course possible to apply the principles of the invention to the single-unit form thereof.

While a specific embodiment of the invention has been shown and described in detail to illustrate the application of the inventive principles, it will be understood that the invention may be embodied otherwise without departing from such principles.

What is claimed is:

1. A motor driven rewind device for a camera comprising:

an electric motor;
   switching means, for controlling current supply to said electric motor;
   rewind means, driven to move by said motor to rewind a film;
   a rewind control member, for changing over said switching means;
   a lock member, locking said rewind control member in an initial position and a rewind mode position; and
   a lock release member, controlling said lock member.

2. A device according to claim 1, further including: bias means, urging said rewind control member toward the initial position.

3. A device according to claim 2, wherein said lock release member is positioned adjacent the rear side of said rewind control member as viewed from the direction of actuation.

4. A device according to claim 3, wherein said lock member is urged toward said rewind control member, and has a projected portion for engagement with said rewind control member.

5. A device according to claim 4, wherein said lock release member when operated in a direction almost perpendicular to the direction of actuation of said rewind control member releases the engagement of said lock member with said rewind control member.

6. A motor driven rewind device for a camera capable, upon engagement of a rewind coupler with the spool hub of a film patrone, of rewinding a film, comprising:

an electric motor;
   switching means controlling current supply to said motor;
   rewind means driven by said motor to move said rewind coupler toward said spool hub and transmitting driving torque of said motor to said rewind coupler, said rewind means operating to cause said rewind coupler to rotate upon initiation of the driving action by said electric motor, said rewind means being arranged to move said rewind coupler at the same time in the direction of engagement of said spool hub in response to rotating action of said rewind coupler;
   absorbing means for absorbing the impact force of said rewind coupler which takes place in directions along and about the rotation axis thereof when said rewind coupler engages said spool hub; and
   a rewind control member for changing over said switching means.

7. A device according to claim 6, wherein said absorbing means is a spring member.

8. A device according to claim 7, wherein said spring member is slidingly movably mounted on the rotary shaft of said rewind means, and is connected at one end thereof to said rotary shaft and at the opposite end thereof to said rewind coupler.

* * * * *